Oct. 27, 1953　　　G. J. PETERSON　　　2,656,681
VARIABLE STROKE POWER ACTUATOR
Filed May 7, 1951　　　　　　　　6 Sheets-Sheet 3
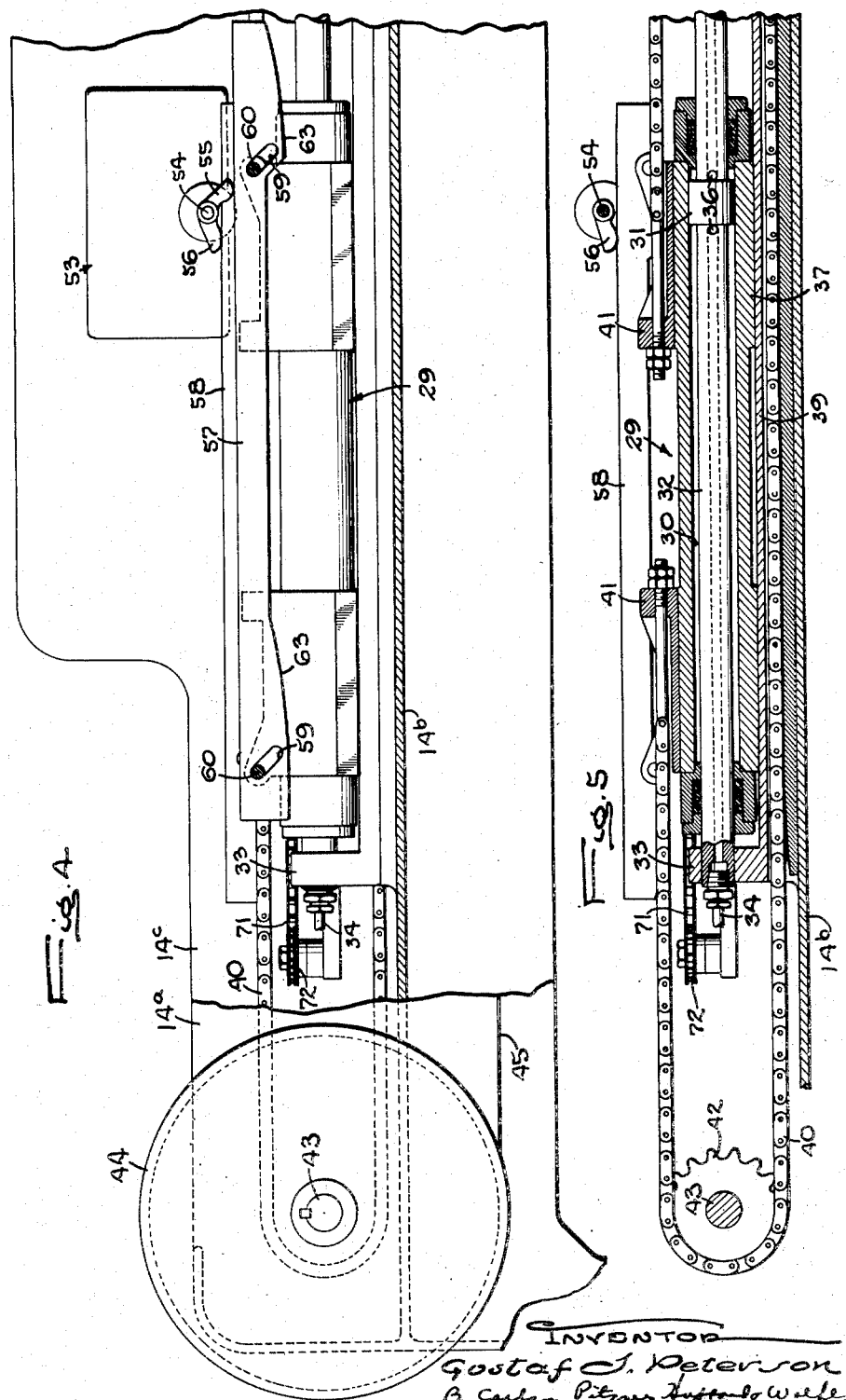

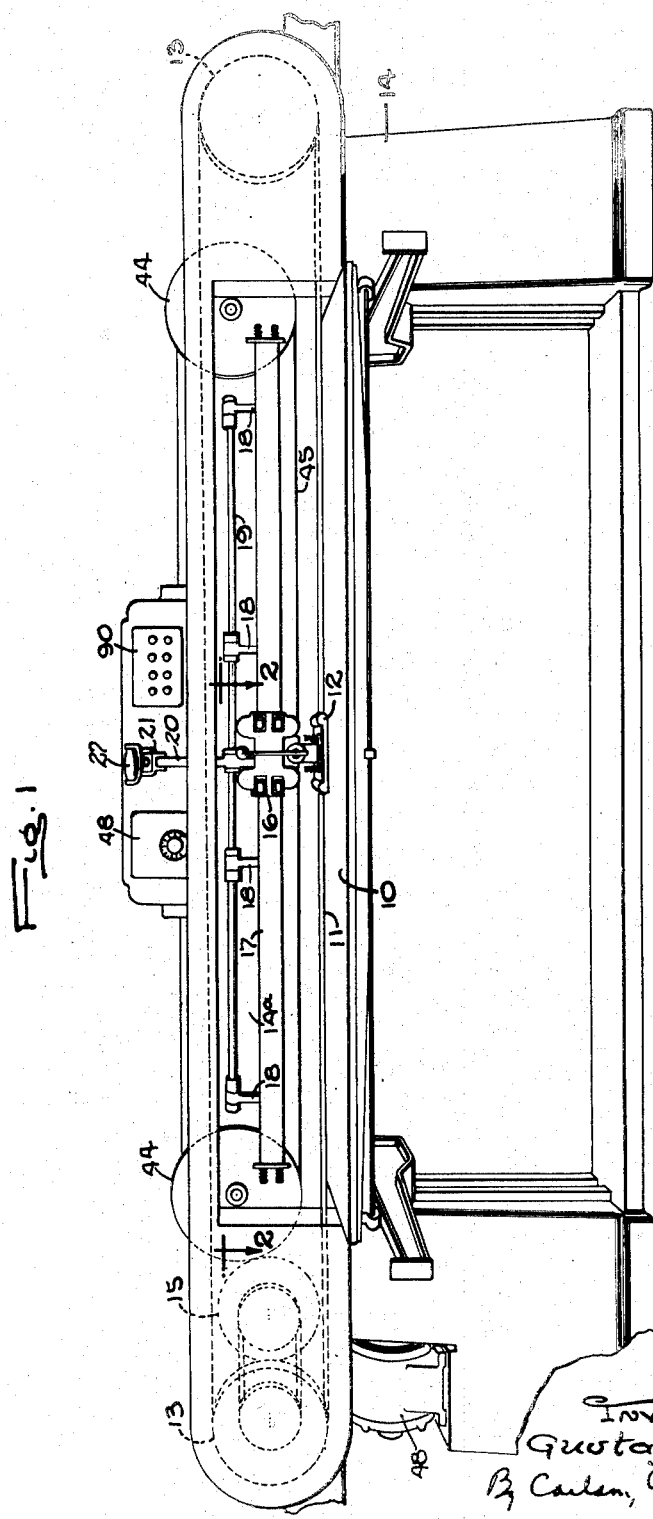

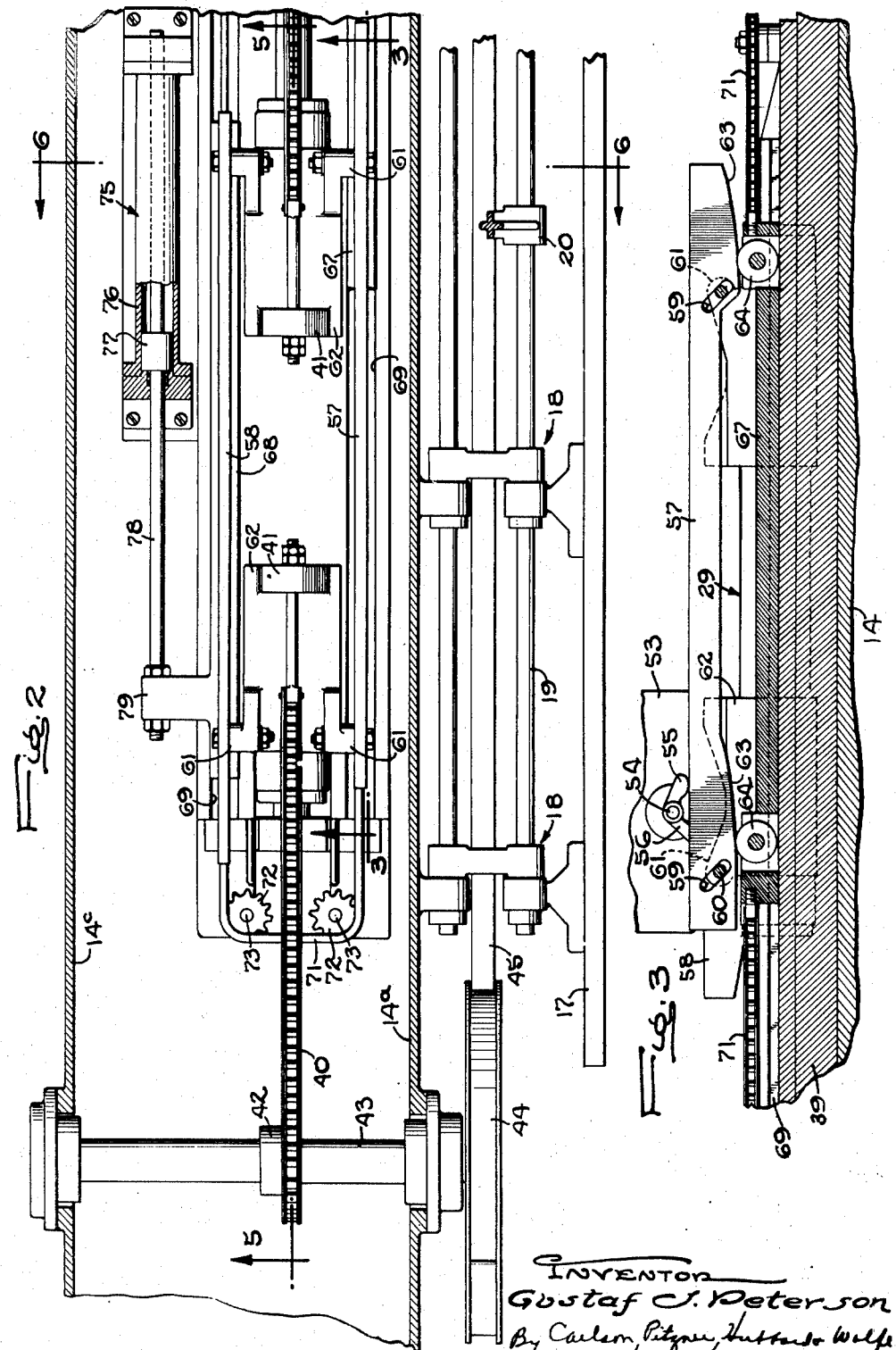

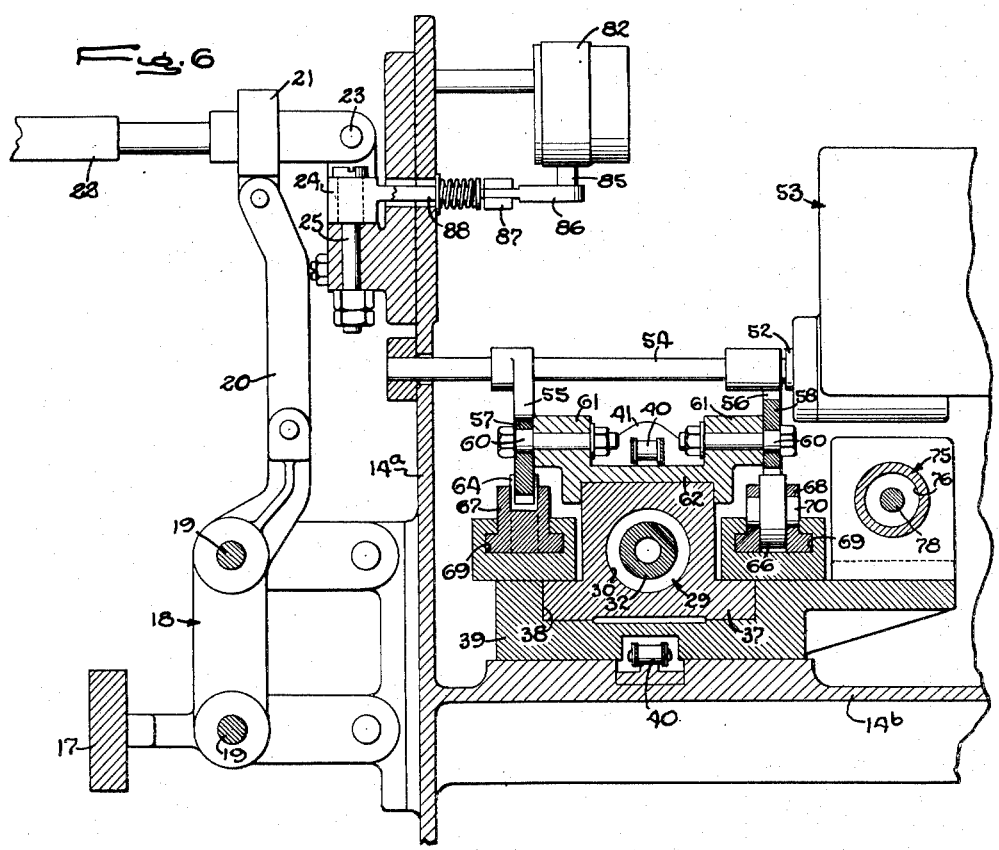
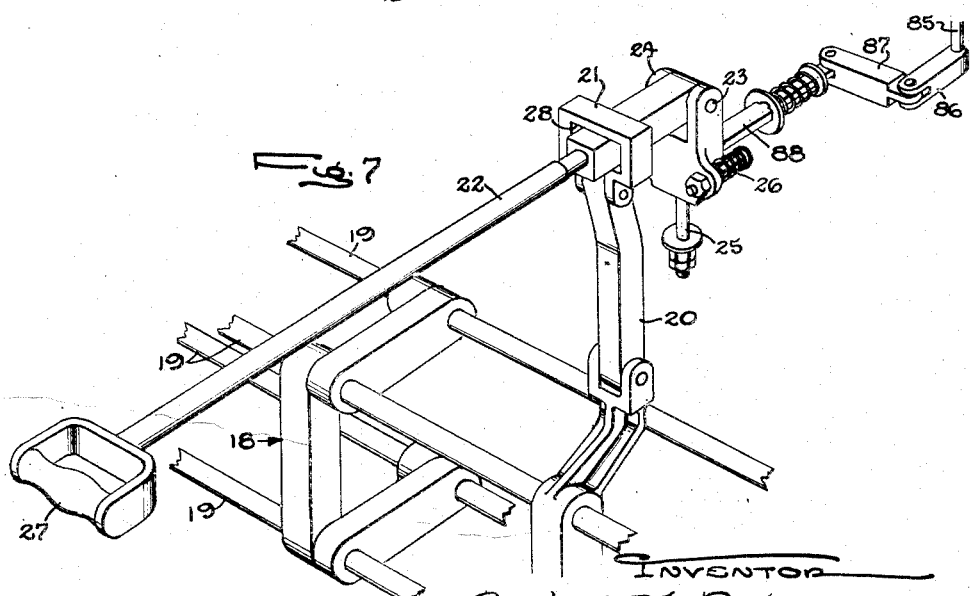

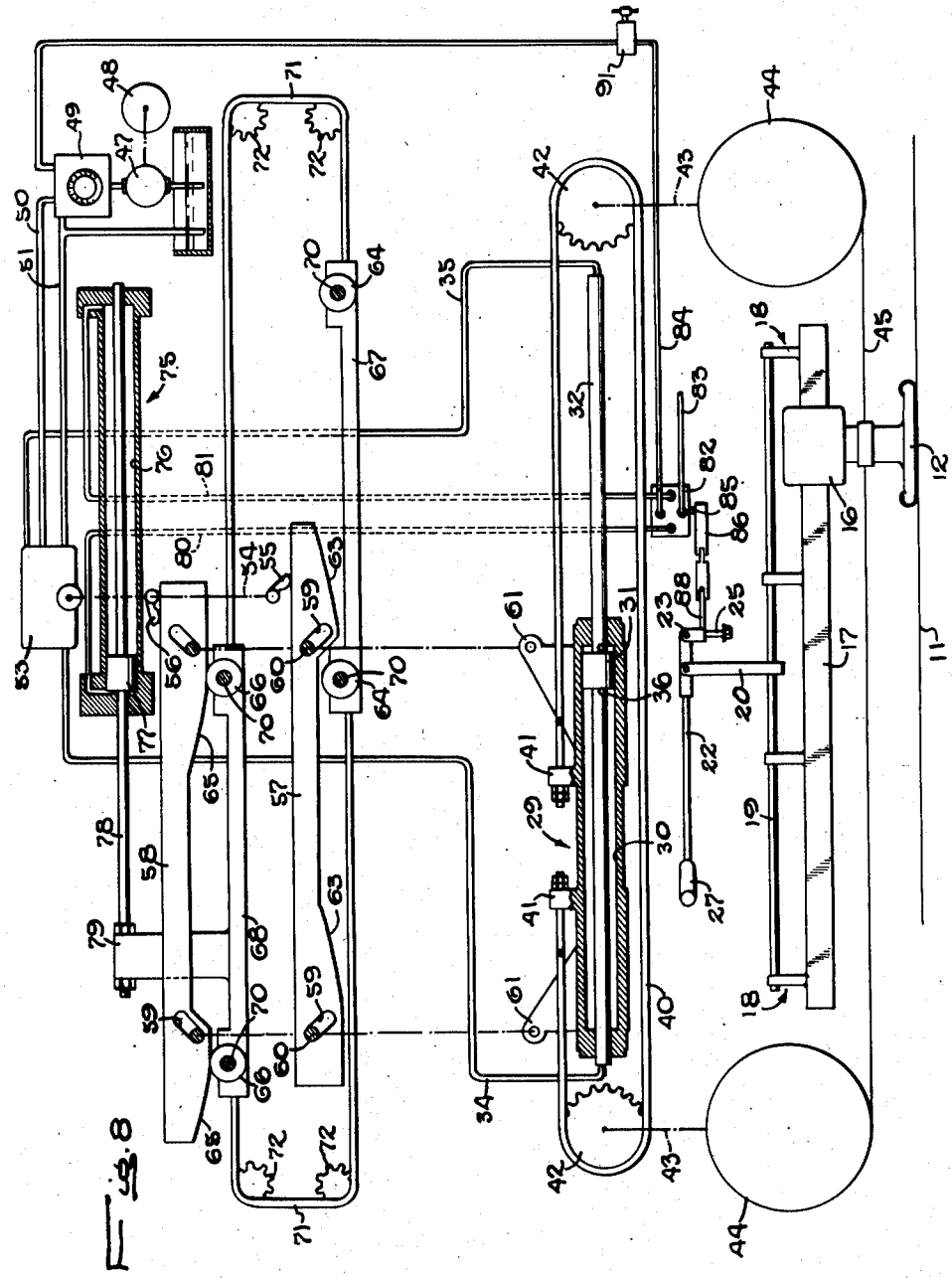

Oct. 27, 1953
G. J. PETERSON
2,656,681
VARIABLE STROKE POWER ACTUATOR
Filed May 7, 1951
6 Sheets-Sheet 6
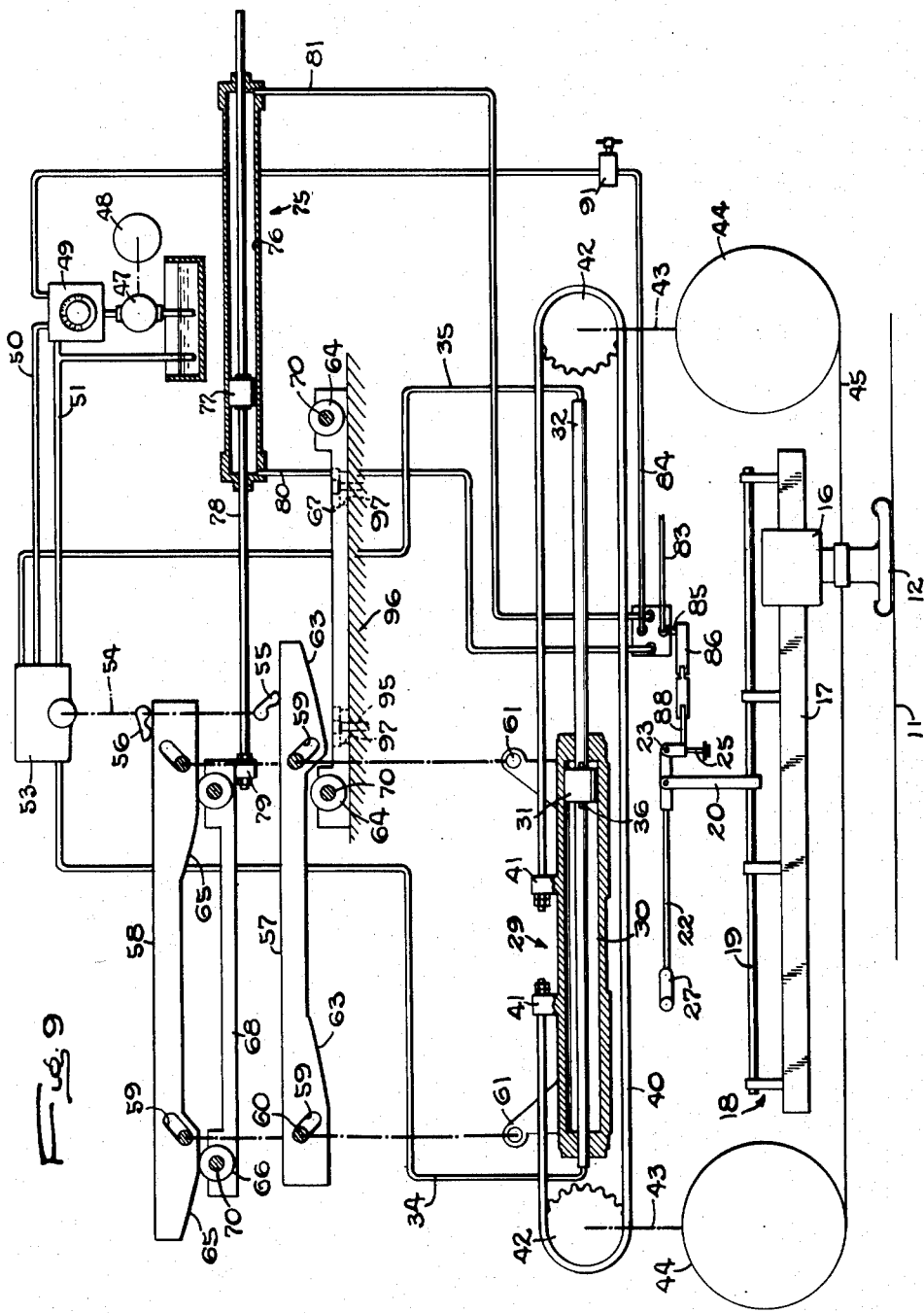
INVENTOR
Gustaf J. Peterson
By Carlsen, Pitzner, Hubbard & Wolfe
ATTORNEY

UNITED STATES PATENT OFFICE 2,656,681

VARIABLE STROKE POWER ACTUATOR

Gustaf J. Peterson, Rockford, Ill., assignor to Mattison Machine Works, Rockford, Ill., a corporation of Illinois Application May 7, 1951, Serial No. 225,007

11 Claims. (Cl. 60—97)

This invention relates to power actuators for oscillating a driven part back and forth and more particularly to those of the type in which the direction of the motion is reversed by the action of stops adjustable to different positions.

One object is to provide in an actuator of the above character a novel mechanism for adjusting the positions of the limit stops while the driven part is in motion.

Another object is to adjust the positions of the limit stops while maintaining the range of oscillation of the driven part centered with respect to a predetermined point.

The invention also resides in the novel and simple construction of the stop adjusting mechanism and in its adaptation for actuation by a reversible power operator.

Other objects and advantages of the invention will become apparent from the following detailed description taken in connection with the accompanying drawings, in which Figure 1 is a fragmentary front elevational view of a rubbing machine incorporating the novel features of the present invention.

Fig. 2 is a fragmentary horizontal sectional view taken along the line 2—2 of Fig. 1.

Figs. 3 and 4 are fragmentary sectional views taken along the line 3—3 of Fig. 2 and showing different positions of the parts.

Figs. 5 and 6 are sectional views taken respectively along the lines 5—5 and 6—6 of Fig. 2.

Fig. 7 is a fragmentary perspective view of the manually operable control mechanism.

Fig. 8 is a schematic view and hydraulic circuit diagram.

Fig. 9 is a view similar to Fig. 8 of a modified form of the control mechanism.

For the purposes of illustration, the invention is shown in the drawings incorporated in a rubbing machine of the type in which a work sheet supported on a slidable horizontal table 10 is sanded by an endless abrasive belt 11 pressed against the work surface by a manually depressible shoe 12 power reciprocated at high speed back and forth longitudinally of the belt. The latter extends around pulleys 13 rotatably supported at opposite ends of a frame structure 14 and belt driven by an electric motor 15. The rubbing shoe is detachably suspended from a carriage 16 slidable along a guide rail 17 supported by the front plate 14ᵃ of the frame 14 through four parallelogram linkages 18 (Figs. 2, 6, and 7) interconnected by rods 19 and urged upwardly by a suitable spring or counterweight (not shown).

Through a link 20, the upper rod 19 is connected to a yoke 21 through which projects the squared rear end of a control lever 22 fulcrumed on a horizontal pivot 23 in a yoke 24. The latter is pivoted on the frame 14 through a vertical pin 25 and urged toward a normal centered position by compression springs 26. By grasping a handle 27 on the forwardly projecting end of the lever 22, the latter may be depressed to lower the rail 17 and apply the desired downward pressure on the shoe 12 or the lever may be swung laterally about the pivot 25 as permitted by the horizontal elongation of the slot 28 in the yoke 21.

Preferably, reciprocation of the shoe 12 back and forth along the guide rail 17 is effected by a hydraulic actuator 29 comprising a cylinder 30 and a piston 31 therein mounted in horizontal position on the frame 14 behind the front plate 14ᵃ. Herein, the piston is stationary and fast on a tubular rod 32 projecting through the opposite closed ends of the cylinder 30 and secured at opposite ends to lugs 33 (Figs. 4 and 5) upstanding from the horizontal frame plate 14ᵇ. Pressure fluid may be delivered to either end of the cylinder through conduits 34 and 35 communicating with the remote ends of the piston rod which is apertured at 36 on both sides of the piston.

The cylinder 30 is mounted in a block 37 slidable endwise in ways 38 on a rail 39 secured to the frame plate 14ᵇ. A chain 40 connected at opposite ends to lugs 41 on the cylinder block 37 extends around sprockets 42 which are fast on shafts 43 journaled in the upright plates 14ᵃ and 14ᶜ of the frame and, at their forward ends, carrying pulleys 44 which support a belt 45 secured to opposite ends of the shoe carriage 16. The rubbing shoe 12 is thus reciprocated back and forth with the cylinder 30.

Pressure fluid supplied by a pump 47 driven by an electric motor 48 is delivered through the usual flow control valve 49 and a supply line 50 alternately to the conduits 34, 35 the other of which is simultaneously connected to a drain line 51. Such connections may be effected by a standard hydraulic control panel 53 mounted on the frame 14 and manufactured by Vickers, Inc. under the designation U2–1306. This unit comprises a pilot valve responsive to the movement of a member 52 (Fig. 6) and governing the selective positioning of a main valve for reversing the connections between the supply and drain lines 50 and 51 and the pipes 34 and 35 as the pilot member is rocked back and forth between its two control positions respectively shown in Figs. 3 and 4. Herein, the member 52 is carried by a horizontal rockshaft 54 having fast therein two axially spaced arms 55 and 56 bearing against the straight upper edges of vertically disposed bars 57 and 58 each having upwardly extending parallel slots 59 therein loosely receiving headed pins 60 which project from flanges 61 on a plate 62 secured against the top of the cylinder block 37. The bars 57 and 58 thus move with the cylinder 30 and the reciprocating rubbing shoe 12 but are movable bodily and upwardly as permitted by the slots 59.

On its underside and near opposite ends, the bar 57 is formed with inclined cam surfaces 63 which, as the bar reaches the right-hand end of its range of reciprocation with the rubbing shoe, encounters stops in the form of rollers 64 which act as cams to raise the bar and thus swing the arm 55 and the pilot valve rockshaft counterclockwise as viewed in Fig. 8. Similar cam surfaces 65 formed on the bar 58 encounter stop rollers 66 which cam the bar upwardly in the final movement of the rubbing shoe to the left. As shown in Fig. 8, the arm 56 is thus swung clockwise and the position of the pilot valve is reversed.

In accordance with one aspect of the invention, the stops 64 and 66 are mounted for movement toward and away from each other in unison so that the range of reciprocation of the rubbing shoe may be lengthened or shortened while maintaining this range centered with respect to a predetermined point on the workpiece being operated on. For this purpose, the rollers 64 and 66 are journaled on pins 70 carried by two slides 67 and 68 respectively slidable along guideways 69 (Fig. 6) in bars secured to the frame plate 39. The corresponding ends of the two slides are connected by chains 71 extending around sprockets 72 on parallel shafts 73 which are journaled on the frame 14 and disposed perpendicular to the sprocket shafts 43. By such interconnection, the slides move in unison with each other but in opposite directions so that irrespective of their position of adjustment, the respective rollers of the two sets will be disposed equidistant from the center of the work table.

Such adjustment of the stops in unison is effected in the present instance by a reversible power operator 75 responsive to lateral swinging of the handle 28 by which pressure is applied to the rubbing shoe. Herein, the operator is of the hydraulic type comprising a cylinder 76 secured to the frame plate 39 and a piston 77 slidable in the cylinder and having a rod 78 projecting from one cylinder end and connected to a lug 79 on the rear stop slide 68. Through pipes 80 and 81 and a valve 82, either end of the cylinder 76 may be connected to a drain line 83 while the other end is connected to a second pressure supply line 84 leading from the flow control valve 49. The valve 82 is of the leak-proof type such as a four way valve sold by the designation 185-8-FP by Electrol, Incorporated of Kingston, New York. This valve is operated by rocking of a shaft 85 (Figs. 6, 7, and 8) having an arm 86 thereon with its free end connected by a link 87 to a rod 88 which is rigid with and projects from the swingable yoke 24. When the control lever 22 is in its center position shown in Fig. 7, the shaft 85 of the valve 82 will be disposed in a position to block the flow of pressure fluid to both ends of the cylinder 76 and prevent the escape of fluid from either end of the cylinder. The position of the stops 64 and 66 is then fixed and the rubbing shoe reciprocates through a fixed range whenever the pump motor 48 is running, the latter being controllable by manually operable push button switches on the control panel 90 (Fig. 1) of the machine.

Now, if the control lever 22 is swung to the left as viewed in Fig. 7, the valve stem 85 will be rocked counterclockwise thus conditioning the valve 82 for the admission of pressure fluid to the right-hand end (Fig. 8) of the cylinder 76. The piston 77 is then moved to the left at a slow rate determined by the setting of a manually adjustable metering valve 91 (Fig. 8). As a result, the stop rolls are moved outwardly and thus separated so as to lengthen the range of reciprocation of the rubbing shoe while always maintaining the range centered with respect to the center of the work table. The operator may easily gauge the amount of the lengthening by observing the extent of movement of one end of the rubbing shoe in relation to the work being operated upon. When the desired lengthening has occurred, the control lever 22 is swung back to the center or neutral position thus disabling the stroke adjusting operator 75. Thereafter the positions of the stops 64 and 66 remain fixed and the rubbing shoe reciprocates through a corresponding range.

In a similar way, the hydraulic connections are reversed by movement of the control lever handle 27 to the right from the neutral position. The resulting admission of fluid to the left end of the cylinder 76 (Fig. 8) causes the stop rolls 64 and 66 to be advanced slowly and inwardly toward each other. The strokes of the rubbing element are correspondingly shortened and the latter continues until the control lever has been swung back to the neutral position. As before, the movements of the rubbing element in opposite directions from the center of the work table remain equal.

In certain sanding operations on machines of the above character, it is desirable to lengthen the range of reciprocation of the rubbing shoe in one direction only. This may be accomplished with the control mechanism above described by disconnecting the movable stop bars 67 and 68 from each other and maintaining one of the bars in a fixed position. Such a modification is shown in Fig. 9 wherein the bar 67, which determines the right hand limit of travel of the shoe 12, is fastened as by screws 95 to a stationary part 96 of the machine frame. The bar 68 whose rollers 66 limit the left hand end of the shoe range is as before adapted to be shifted back and forth selectively by controlling the admission of pressure fluid to opposite ends of the cylinder 70. Thus, the operator may, by manipulating the control lever 22 energize the actuator 75 to lengthen the shoe stroke while always maintaining the right hand limit thereof in a fixed position. Of course, the latter may be changed as desired by adjusting the position of the bar 67 along the machine frame as permitted by slots 97 in the bar, these being of any desired length.

I claim as my invention:

1. The combination of, a hydraulic actuator having a driven part movable back and forth in response to the delivery of pressure fluid to the actuator in opposite directions, a reversing valve movable between opposite positions to control the direction of flow of fluid to said actuator, two members movable back and forth in unison with said driven part but individually shiftable transversely of such movement to move said valve from one of said positions to the other, stops spaced along the paths of movement of the respective members for engagement with the associated member to cam the same transversely and actuate said valve whereby to reverse the motion of said actuator, an element supporting said stops and having parts movable in opposite directions along the paths of movement of said members to respectively shift the stops equal distances toward or away from each other, a reversible power operator for moving said supporting element, and means selectively operable to energize said operator for moving said supporting element in one direction or the other and thereby shift the stops in unison and through equal distances toward or away from each other.

2. The combination of, a hydraulic actuator having a driven part movable back and forth in response to the delivery of pressure fluid to the actuator in opposite directions, a reversing valve movable between opposite positions to control the direction of flow of fluid to said actuator, two members movable back and forth in unison with said driven part but individually shiftable relative thereto to move said valve from one of said positions to the other, stops spaced along the paths of movement of the respective members for engagement with the associated member to shift the same and actuate said valve whereby to reverse the motion of said acatuor, a support for said stops and movable in opposite directions along the paths of movement of said members to respectively shift the stops equal distances toward or away from each other, and manually controllable means selectively operable to cause movement of said support in one direction or the other and thereby shift the stops toward or away from each other.

3. The combination of, a hydraulic actuator having a driven part movable back and forth in response to the delivery of pressure fluid to the actuator in opposite directions, a reversing valve having an element movable between opposite positions to control the direction of flow of fluid to said actuator, spaced stops selectively operable in response to movement of said driven part at the end of each stroke thereof to shift said valve element whereby to reverse the motion of said actuator, a support for said stops movable in opposite directions to respectively shift the stops equal distances toward or away from each other, and means selectively operable to move said support in one direction or the other and thereby shift the stops toward or away from each other.

4. The combination of, a hydraulic actuator having a driven part movable back and forth in response to the delivery of pressure fluid to the actuator in opposite directions, a reversing valve having an element movable between opposite positions to control the direction of flow of fluid to said actuator, spaced stops selectively operable in response to movement of said driven part at the end of each stroke thereof to shift said valve element whereby to reverse the motion of said actuator, a support for said stops movable in opposite directions to respectively shift the stops toward or away from each other and thereby correspondingly lengthen or shorten the strokes of said driven part, and means for moving said support selectively to different positions.

5. The combination of, a reversible hydraulic actuator having a driven part movable back and forth, a reversing valve controlling the flow of motive fluid to said actuator to determine the direction of movement of said part, two normally stationary spaced stops mounted for movement in unison toward and away from each other, means movable in unison with said driven part and operable upon engagement with the respective stops to shift said valve and reverse the motion of said actuator, a selectively movable member, and a connection between said member and said stops and operable in response to movement of the member to shift the stops in unison toward or away from each other during reciprocation of said driven part while always maintaining the respective stops spaced equidistant from a predetermined point.

6. The combination of, a reversible power actuator having a driven part movable back and forth, a reversing device governing the direction of operation of said actuator, two elements, means supporting said elements for movement in unison with said driven part along parallel paths and also for individual movement relative to said part and transversely of said path, a reversing device responsive to the individual transverse movements of said elements and movable thereby to different positions to reverse the direction of operation of said actuator, a support mounted for movement along a path paralleling the motion of said elements, stops carried by said support and spaced along the paths of movement of the respective elements for engagement with the element to shift the same transversely and actuate said device whereby to reverse the motion of said actuator, and means selectively operable to adjust the position of said support and thereby shift said stops in one direction or the other relative to each other.

7. The combination of, a power actuator having a driven part movable back and forth, a reversing device movable between opposite positions to control the direction of movement of said actuator, a support having laterally spaced portions movable with the support along parallel paths but in opposite directions, stops carried respectively by said portions of said support and spaced along the paths, means movable back and forth in unison with said driven part and engageable with the respective stops to actuate said reversing device and reverse the motion of said actuator, and means selectively operable to shift said support in opposite directions to adjust said stops toward or away from each other.

8. The combination of, a power actuator having a driven part movable back and forth, a reversing control device having an element movable between opposite positions to control the direction of movement of said part by said actuator, stops selectively operable in response to movement of said driven part at the ends of opposite strokes thereof to shift said control element whereby to reverse the motion of said actuator, a support for said stops movable in opposite directions to respectively shift the stops equal distances toward or away from each other, a reversible power operator for moving said support, and control means movable between two active positions through an intermediate neutral position and operable when in said active positions to energize said operator for moving said support in opposite directions respectively, said operator being disabled when said control means is disposed in said intermediate position.

9. The combination of, a reversible power actuator having a driven part movable back and forth, a reversing device controlling the energization of said actuator to determine the direction of movement of said part, two normally stationary spaced stops mounted for movement in unison toward and away from each other, means movable in unison with said driven part and operable upon engagement with the respective stops to shift said device and reverse the motion of said actuator, a selectively movable member, and a connection between said member and said stops and operable in response to movement of the member to shift the stops in unison toward or away from each other during reciprocation of said driven part while always maintaining the respective stops spaced equidistant from a predetermined point.

10. The combination of, a power actuator having a driven part movable back and forth, a reversing control device having an element movable between opposite positions to control the direction of movement of said part by said actuator, stops selectively operable in response to movement of said driven part at the ends of opposite strokes thereof to shift said control element whereby to reverse the motion of said actuator, a support for one of said stops movable in opposite directions to respectively shift the stop toward or away from the other stop, a reversible power operator for moving said support, and control means movable between two active positions through an intermediate neutral position and operable when in said active positions to energize said operator for moving said support in opposite directions respectively, said operator being disabled when said control means is disposed in said intermediate position.

11. The combination of, a power actuator having a driven part movable back and forth, a reversing control device having an element movable between opposite positions to control the direction of movement of said part by said actuator, stops selectively operable in response to movement of said driven part at the ends of opposite strokes thereof to shift said control element whereby to reverse the motion of said actuator, means stationarily supporting one of said stops, a support for the other stop movable in opposite directions to respectively shift the stop toward or away from the fixed stop, a reversible power operator for moving said support, and control means movable between two active positions through an intermediate neutral position and operable when in said active positions to energize said operator for moving said support in opposite directions respectively, said operator being disabled when said control means is disposed in said intermediate position.

GUSTAF J. PETERSON.

References Cited in the file of this patent

UNITED STATES PATENTS

| Number | Name | Date |
|---|---|---|
| 2,090,575 | De Motte | Aug. 17, 1937 |
| 2,124,797 | Rust et al. | July 26, 1938 |
| 2,505,224 | Whitcomb | Apr. 25, 1950 |